United States Patent
Honcoop et al.

(10) Patent No.: US 10,501,571 B2
(45) Date of Patent: *Dec. 10, 2019

(54) POLYURETHANE ELASTOMERS

(71) Applicant: CRODA INTERNATIONAL PLC, Yorkshire (GB)

(72) Inventors: Wilhelmus Adrianus Jacobus Honcoop, Bergembacht (NL); Remco Benjamin Van Triet, Reeuwuk (NL); Angela Leonarda Maria Smits, Zeist (NL)

(73) Assignee: CRODA INTERNATIONAL PLC (GB)

(*) Notice: Subject to any disclaimer, the term of this patent is extended or adjusted under 35 U.S.C. 154(b) by 0 days.

This patent is subject to a terminal disclaimer.

(21) Appl. No.: 15/117,976

(22) PCT Filed: Feb. 5, 2015

(86) PCT No.: PCT/GB2015/050308
§ 371 (c)(1),
(2) Date: Aug. 10, 2016

(87) PCT Pub. No.: WO2015/121620
PCT Pub. Date: Aug. 20, 2015

(65) Prior Publication Data
US 2016/0355633 A1 Dec. 8, 2016

(30) Foreign Application Priority Data
Feb. 14, 2014 (GB) .................................. 1402580

(51) Int. Cl.
| C08G 18/34 | (2006.01) |
| C08G 18/66 | (2006.01) |
| C08G 18/68 | (2006.01) |
| C08G 18/76 | (2006.01) |
| C08G 18/42 | (2006.01) |
| C08G 63/553 | (2006.01) |
| C08G 18/32 | (2006.01) |

(52) U.S. Cl.
CPC ....... *C08G 18/341* (2013.01); *C08G 18/3206* (2013.01); *C08G 18/4233* (2013.01); *C08G 18/4252* (2013.01); *C08G 18/4288* (2013.01); *C08G 18/664* (2013.01); *C08G 18/686* (2013.01); *C08G 18/7671* (2013.01); *C08G 63/553* (2013.01)

(58) Field of Classification Search
CPC .............. C08G 18/341; C08G 18/3206; C08G 18/4288; C08G 18/664; C08G 18/4233; C08G 18/7671; C08G 18/686; C08G 18/4252; C08G 63/553
See application file for complete search history.

(56) References Cited

U.S. PATENT DOCUMENTS

| 3,957,753 | A | 5/1976 | Hostettler et al. |
| 4,430,131 | A | 2/1984 | Tremblay |
| 4,602,079 | A | 7/1986 | Vinches et al. |
| 5,326,815 | A | 7/1994 | Serdiuk et al. |
| 8,067,479 | B2 | 11/2011 | Cameron et al. |
| 2005/0143549 | A1 | 6/2005 | Schijndel et al. |
| 2011/0071238 | A1 | 3/2011 | Bastioli et al. |
| 2011/0306734 | A1 | 12/2011 | Brauer et al. |

FOREIGN PATENT DOCUMENTS

| CN | 1633452 A | 6/2005 |
| CN | 1639220 A | 7/2005 |
| CN | 103483571 A | 1/2014 |
| EP | 2567996 A1 * | 3/2013 |
| GB | 1376353 | 12/1974 |
| JP | 06211959 A | 8/1994 |
| JP | 2002212273 A | 7/2002 |
| JP | 2002249759 A | 9/2002 |
| JP | 2011256384 A | 12/2011 |
| JP | 2013155388 A | 8/2013 |
| WO | 2008067967 A2 | 6/2008 |
| WO | 2011043660 A2 | 4/2011 |
| WO | 2012005645 A1 | 1/2012 |
| WO | WO 2013/034305 A1 * | 3/2013 |

OTHER PUBLICATIONS

International Preliminary Report on Patentability and Written Opinion, dated Aug. 16, 2016, for International Application No. PCT/GB2015/050308, 7 pages.
International Search Report for PCT/GB2015/050308, dated Apr. 16, 2015, 2 Pages.
T. E. Breuer, 'Dimer Acids', in J. I. Kroschwitz (ed.), Kirk-Othmer Encyclopedia of Chemical Technology, 4th Ed., Wily, New York, 1993, vol. 8, pp. 223-237. Abstract only.
Chinese Office Action for Chinese Application No. 201580008316.8, dated Apr. 4, 2018 with translation, 34 pages. 2018.
Rejection Decision for Chinese Application No. 201580008316.8, dated Apr. 23, 2019, with translation, 9 pages.
Liu, Y., "Brochure of Polyurethane Raw Materials and Auxiliaries," edited, Jan. 2013, pp. 147 and 267-269, Chemical Industry Press, 2nd Edition.

\* cited by examiner

*Primary Examiner* — Rabon A Sergent
(74) *Attorney, Agent, or Firm* — RatnerPrestia

(57) ABSTRACT

The present invention relates to a polyurethane elastomer obtainable by reacting a polyol and an isocyanate wherein the polyol comprises a) at least one dimer fatty residue selected from a dimer fatty diacid residue, a dimer fatty diol residue and a dimer fatty diamine residue; and b) at least one furan dicarboxylic acid residue. The invention also relates to a polyol for making the polyurethane elastomer, the use of the polyol and a method of making the polyurethane.

15 Claims, No Drawings

POLYURETHANE ELASTOMERS

CROSS REFERENCE TO RELATED APPLICATIONS

This application is the National Stage filing of International Appln. No. PCT/GB2015/050308, filed 5 Feb. 2015, and claims priority of GB Application No. 1402580.3, filed 14 Feb. 2014, the entirety of which applications is incorporated herein by reference for all purposes.

The present invention relates to a polyurethane elastomer, a polyol for making the polyurethane elastomer, the use of the polyol and a method of making the polyurethane.

Polyurethanes may be used to make elastomers. An elastomer is a polymer which exhibits elasticity i.e. a tendency to return to its original shape after being deformed. Polyurethane elastomers may be used to make molded flexible parts.

Polyurethane elastomers are used in many applications including cabling, tubing, belting, sportswear (e.g. sports shoes, goggles, ski boots), films/sheets and automotive interiors (e.g. grips, armrests, consoles).

A polyurethane may be made by reacting a polyisocyanate with a polyol.

A polyurethane elastomer may be based on a pre-polymer made by reacting a polyol with an excess molar amount of a polyisocyanate. The pre-polymer may then be reacted with a chain extender to form the polyurethane elastomer.

The present invention seeks to provide an improved polyurethane elastomer and/or a polyol which may be used in making the polyurethane elastomer so that one or more properties (e.g. physical properties) of the polyurethane elastomer is improved. These improved properties may include one or more of hardness, tensile strength, modulus and chemical or hydrolysis resistance or an improvement in a combination of these properties.

The present invention is based in part on the recognition by the applicant that the use of a residue of a furan dicarboxylic acid (FDCA) in combination with a dimer fatty residue in a polyol may provide a polyurethane elastomer which comprises the polyol with improved properties which balance flexibility and chemical/hydrolysis resistance with increased hardness or tensile strength. Without being bound by theory, it is believed that the dimer fatty residue may provide the flexibility and hydrolysis resistance due to its amorphous and hydrophobic nature and the residue of a furan dicarboxylic acid may provide the hardness or tensile strength due to its crystalline or semi-crystalline nature.

Thus viewed from a first aspect, the present invention provides a polyurethane elastomer obtainable by reacting a polyol and a polyisocyanate wherein the polyol comprises:
  a) at least one dimer fatty residue selected from a dimer fatty diacid residue, a dimer fatty diol residue and a dimer fatty diamine residue; and
  b) at least one residue of a furan dicarboxylic acid.

Viewed from a second aspect, the present invention provides a polyol for use in making a polyurethane elastomer, wherein the polyol comprises:
  a) at least one dimer fatty residue selected from a dimer fatty diacid residue, a dimer fatty diol residue and a dimer fatty diamine residue; and
  b) at least one furan dicarboxylic acid residue.

The polyol of the second aspect of the invention may include any of the features described herein with regard to the polyol described in connection with the polyurethane elastomer of the first aspect of the invention.

Viewed from a third aspect, the present invention provides a method of making a polyurethane elastomer comprising reacting a polyol of the second aspect of the invention with a polyisocyanate to form:
  (i) the polyurethane elastomer; or
  (ii) an isocyanate-terminated pre-polymer which is then reacted with a chain extender to form the polyurethane elastomer.

Viewed from a fourth aspect, the present invention provides the use of a polyol of the second aspect of the invention to form a polyurethane.

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the polyol or polyurethane of the present invention are obtained from natural sources. Such chemicals typically include a mixture of chemical species due to their natural origin. Due to the presence of such mixtures, various parameters defined herein can be an average value and may be non-integral.

The term 'polyol' is well known in the art, and refers to a molecule comprising more than one hydroxyl group. The term 'active hydrogen' refers to the hydrogen atoms present as part of the hydroxyl groups of the polyol.

The term 'polyester' as used herein refers to a molecule or group with more than one ester bond.

The term 'functionality' as used herein with regard to a molecule or part of a molecule refers to the number of functional groups in that molecule or part of a molecule. A 'functional group' refers to a group in a molecule which may take part in a chemical reaction. For example, a carboxylic acid group, a hydroxyl group and an amine group are all examples of functional groups. For example, a diacid (with two carboxylic acid groups) and a diol (with two hydroxyl groups) both have a functionality of 2 and a triacid and triol both have a functionality of 3.

The term 'dimer fatty residue' as used herein, unless otherwise defined, refers to a residue of a dimer fatty acid (also referred to as a dimer fatty diacid) or a residue of a dimer fatty diacid derivative such as a dimer fatty diol or a dimer fatty diamine.

The term 'dimer fatty acid' (also referred to as dimer fatty diacid) is well known in the art, and refers to the dimerisation products of mono- or polyunsaturated fatty acids and/or esters thereof.

The related term trimer fatty acid similarly refers to trimerisation products of mono- or polyunsaturated fatty acids and/or esters thereof.

Dimer fatty acids are described in T. E. Breuer, 'Dimer Acids', in J. I. Kroschwitz (ed.), Kirk-Othmer Encyclopedia of Chemical Technology, 4th Ed., Wily, N.Y., 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty acids, but is mostly made up of dimer fatty acids. The resultant product can be prepared with various proportions of the different fatty acids as desired.

The ratio of dimer fatty acids to trimer fatty acids can be varied, by modifying the processing conditions and/or the unsaturated fatty acid feedstock. The dimer fatty acid may be isolated in substantially pure form from the product mixture, using purification techniques known in the art, or alternatively a mixture of dimer fatty acid and trimer fatty acid may be employed.

The dimer fatty acids or dimer fatty residues used in the present invention are preferably derived from the dimerisation products of C10 to C30 fatty acids, more preferably C12 to C24 fatty acids, particularly C14 to C22 fatty acids, further preferably C16 to C20 fatty acids, and especially C18 fatty acids. Thus, the resulting dimer fatty acids preferably comprise in the range from 20 to 60, more preferably 24 to 48, particularly 28 to 44, further preferably 32 to 40, and especially 36 carbon atoms.

The fatty acids, from which the dimer fatty acids are derived, may be selected from linear or branched unsaturated fatty acids. The unsaturated fatty acids may be selected from fatty acids having either a cis/trans configuration, and may have one or more than one unsaturated double bonds.

Preferably, the fatty acids used are linear monounsaturated fatty acids.

The dimer fatty acids may be hydrogenated. The dimer fatty acids may be non-hydrogenated. A hydrogenated dimer fatty residue (from a diacid, diol or diamine) may have better oxidative or thermal stability which may be desirable in a polyurethane formed from the co-polymer polyol.

Suitable dimer fatty acids are preferably derived from (i.e. are the dimer equivalents of) the dimerisation products of oleic acid, linoleic acid, linolenic acid, palmitoleic acid, or elaidic acid. In particular, suitable dimer fatty acids are derived from oleic acid.

The dimer fatty acids may be dimerisation products of unsaturated fatty acid mixtures obtained from the hydrolysis of natural fats and oils, e.g. sunflower oil, soybean oil, olive oil, rapeseed oil, cottonseed oil, or tall oil.

The molecular weight (weight average) of the dimer fatty acid is preferably in the range from 450 to 690, more preferably 500 to 640, particularly 530 to 610, and especially 550 to 590.

In addition to the dimer fatty acids, dimerisation usually results in varying amounts of trimer fatty acids (so-called "trimer"), oligomeric fatty acids, and residues of monomeric fatty acids (so-called "monomer"), or esters thereof, being present. The amount of monomer can, for example, be reduced by distillation.

Similarly, the optional trimer fatty acids are preferably derived from the trimerisation products of the materials mentioned with regard to the dimer fatty acids, and are preferably trimers of C10 to C30, more preferably C12 to C24, particularly C14 to C22, further preferably C16 to C20 fatty acids, and especially C18 fatty acids. Thus, the trimer fatty acids preferably contain in the range from 30 to 90, more preferably 36 to 72, particularly 42 to 66, further preferably 48 to 60, and especially 54 carbon atoms.

The molecular weight (weight average) of the trimer fatty triacids is preferably in the range from 750 to 950, more preferably 790 to 910, particularly 810 to 890, and especially 830 to 870.

In one embodiment of the present invention, tetramer fatty acids and higher oligomers (hereinafter both referred to as oligomeric acids) are formed during production of the dimer fatty acid. Such oligomeric acids may therefore also be present in the dimer fatty acids used in the present invention, in combination with trimer fatty acids and/or dimer fatty acids and/or mono fatty monoacids.

The oligomeric acids are preferably oligomers, containing 4 or more units derived from C10 to C30, more preferably C12 to C24, particularly C14 to C22, and especially C18 fatty acids. The molecular weight (weight average) of the oligomeric acid is suitably greater than 1,000, preferably in the range from 1,200 to 1,800, more preferably 1,300 to 1,700, particularly 1,400 to 1,600, and especially 1,400 to 1,550.

The dimer fatty acid used in the present invention preferably may have a dimer fatty acid (or dimer) content of greater than 60 wt. %, more preferably greater than 70 wt. %, particularly greater than 80 wt. %, and especially greater than 85 wt. %. Most preferably, the dimer content of the dimer fatty acid is in the range from 90 wt. % to 99 wt. %.

In an alternative embodiment, the dimer fatty acid preferably has a dimer fatty acid (or dimer) content in the range from 70 wt. % to 96 wt. %. This may be applicable in particular for two component or cross-linked systems.

In addition, particularly preferred dimer fatty acids may have a trimer fatty acid (or trimer) content of less than 40 wt. %, more preferably less than 30 wt. %, particularly less than 20 wt. %, and especially less than 15 wt. %. The trimer fatty acid content may be less than 1 wt. %.

Furthermore, the dimer fatty acid preferably comprises less than 10 wt. %, more preferably less than 6 wt. %, particularly less than 4 wt. %, and especially less than 3.5 wt. % of mono fatty monoacid (or monomer).

All of the above weight percentage values are based on the total weight of polymerised fatty acids and mono fatty acids present.

A dimer fatty diacid (or dimer fatty acid) may be converted to a dimer fatty diol as is known in the art. For example, a dimer fatty diol may be formed by hydrogenation of the corresponding dimer fatty acid. A dimer fatty diol may have properties as described herein with regard to a dimer fatty diacid (or dimer fatty acid) except that the acid groups in the dimer fatty diacid are replaced with hydroxyl groups in the dimer fatty diol. In a similar manner, a trimer fatty triacid may be converted to a trimer fatty trial which may have properties as described herein with regard to a trimer fatty triacid.

The dimer fatty diol may be hydrogenated. The dimer fatty diol may be non-hydrogenated.

A dimer fatty diacid (or dimer fatty acid) may be converted to a dimer fatty diamine as is known in the art. A dimer fatty diamine may have properties as described herein with regard to a dimer fatty diacid (or dimer fatty acid) except that the acid groups in the dimer fatty diacid are replaced with amine groups in the dimer fatty diamine. In a similar manner, a trimer fatty triacid may be converted to a trimer fatty triamine which may have properties as described herein with regard to a trimer fatty triacid.

The dimer fatty diamine may be hydrogenated. The dimer fatty diamine may be non-hydrogenated.

The polyurethane elastomer of the first aspect of the invention is obtainable by reacting a polyol and an isocyanate.

The polyol as described herein may be a polyol of the second aspect of the invention.

One of the components of the polyol is:
  a) at least one dimer fatty residue selected from a dimer fatty diacid residue, a dimer fatty diol residue and a dimer fatty diamine residue.

The at least one dimer fatty residue may include any of the features or preferences described herein with regard to dimer fatty diacids, dimer fatty diols or dimer fatty diamines.

The at least one dimer fatty residue may be saturated or unsaturated. Preferably the at least one dimer fatty residue is saturated.

The dimer fatty residue is fatty in nature and this may increase the hydrophobicity of the polyol. The presence of the dimer fatty residue may make the polyol more amorphous, non-crystalline or substantially non-crystalline. The amorphousness may increase the flexibility and/or decrease the tensile strength of a polyurethane formed from the polyol.

The polyol may comprise at least 10 wt % dimer fatty residue, preferably at least 20 wt %, more preferably at least 30 wt %. The polyol may comprise at most 80 wt % dimer fatty residue, preferably at most 70 wt %. Preferably the polyol comprises at least 20 wt % and at most 80 wt % of the at least one dimer fatty residue.

The at least one dimer fatty residue may be selected from a dimer fatty diacid residue and a dimer fatty diamine residue.

The at least one dimer fatty residue may be a dimer fatty diacid residue.

The polyol may comprise at least 10 wt % dimer fatty diacid residue, preferably at least 20 wt %, more preferably at least 30 wt %. The polyol may comprise at most 80 wt % dimer fatty diacid residue, preferably at most 70 wt %.

The polyol may not comprise a dimer fatty diol residue.

These amounts of dimer fatty residue may provide a suitable amount of hydrophobicity and/or amorphousness to the polyol without an excessive decrease in tensile strength or hardness of a polyurethane formed from the polyol.

One of the components of the polyol is:
b) at least one furan dicarboxylic acid residue.

The furan dicarboxylic acid used in making the polyol may be 2,3-, 3,4- or 2,5-furan dicarboxylic acid or mixtures thereof or a corresponding alkyl ester, such as a methyl and/or ethyl mono and/or diester, or a corresponding halide, such as a corresponding chloride, bromide and/or iodide. Preferably the furan dicarboxylic acid is 2,5-furan dicarboxylic acid. Preferably the furan dicarboxylic acid residue is derived from a furan dicarboxylic acid alkyl ester, more preferably a methyl ester, for example a methyl diester.

Preferably the at least one furan dicarboxylic acid residue is a 2,3-, 3,4- or 2,5-furan dicarboxylic acid residue or mixtures thereof. More preferably the at least one furan dicarboxylic acid residue is a 2,5-furan dicarboxylic acid residue.

Furan-based monomers such as 2,5-furan dicarboxylic acid are available under the trade name 'YXY' from Avantium. Alternatively, furan dicarboxylic acids can be made by the method disclosed in WO2011/043660.

The presence of the furan dicarboxylic acid residue in the polyol may make the polyol more crystalline. The increased crystallinity may increase the tensile strength and/or hardness of a polyurethane elastomer formed from the polyol.

The polyol may comprise at least 1 wt % of the furan dicarboxylic acid residue, preferably at least 5 wt %, more preferably at least 8 wt %, even more preferably at least 10 wt %. The polyol may comprise at most 50 wt % of the furan dicarboxylic acid residue, preferably at most 40 wt %, more preferably at most 30 wt %, yet more preferably at most 20 wt %, even more preferably at most 15 wt %. Preferably the polyol comprises at least 5 wt % and at most 40 wt % of the at least one furan dicarboxylic acid residue.

These amounts of the furan dicarboxylic acid residue may provide a suitable amount of crystallinity to the polyol without an excessive decrease in flexibility of a polyurethane formed from the polyol.

If the polyol comprises at most 20 wt % of the furan dicarboxylic acid residue, this may cause the polyol to have improved processability when making a polyurethane elastomer when compared with a polyol which comprises more than 20 wt % of the furan dicarboxylic acid residue. The improved processability may be in the form of a reduced melting point temperature (Tm) of the polyol which may be advantageous when making a polyurethane elastomer.

The furan dicarboxylic acid residue is preferably derived from renewable and/or bio-based sources. The level of this may be determinable by ASTM D6866 as a standardised analytical method for determining the bio-based content of samples using $^{14}C$ radiocarbon dating. ASTM D6866 distinguishes carbon resulting from bio-based inputs from those derived from fossil-based inputs. Using this standard, a percentage of carbon from renewable sources can be calculated from the total carbon in the sample.

The furan dicarboxylic acid residue may have a renewable carbon content of at least 50 wt % when determined using ASTM D6866, preferably at least 65 wt %, more preferably at least 80 wt %.

The weight ratio of dimer fatty residue to furan dicarboxylic acid residue in the polyol may be at least 1:1, preferably at least 2:1, more preferably at least 3:1, even more preferably at least 4:1. The weight ratio of dimer fatty residue to furan dicarboxylic acid residue in the polyol may be at most 20:1, preferably at most 15:1, more preferably at most 10:1. Preferably the weight ratio of dimer fatty residue to furan dicarboxylic acid residue in the polyol is at least 4:1 and at most 20:1.

A lower weight ratio of dimer fatty residue to furan dicarboxylic acid residue in the polyol may cause the polyol to have an increased melting point temperature (Tm) due to the greater presence of the furan dicarboxylic acid residue.

A weight ratio of dimer fatty residue to furan dicarboxylic acid residue in the polyol of at least 4:1 may cause the polyol to have improved processability when making a polyurethane elastomer. The improved processability may be in the form of a reduced melting point temperature (Tm) of the polyol which may be advantageous when making a polyurethane elastomer.

The polyol may comprise at least one residue of a dicarboxylic acid which is not a dimer fatty diacid or a furan dicarboxylic acid (referred to herein as a non-dimeric, non-FDCA diacid)

The non-dimeric, non-FDCA diacid may be aliphatic or aromatic (such as phthalic acid, isophthalic acid and terephthalic acid), and include dicarboxylic acids and their esters, preferably alkyl esters, thereof.

The non-dimeric, non-FDCA diacid may be a linear dicarboxylic acid having a carbon chain in the range from 4 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, and dodecane dicarboxylic acid. Adipic acid is particularly preferred.

The polyol may comprise at least 5 wt % non-dimeric, non-FDCA diacid, preferably at least 10 wt %, more preferably at least 20 wt %. The polyol may comprise at most 50 wt % non-dimeric, non-FDCA diacid, preferably at most 40 wt %, more preferably at most 30 wt %.

The polyol may comprise at least one residue of one or more diols which are not dimer fatty diols (referred to herein as non-dimeric diols). Preferably the non-dimeric diols have from 2 to 10 carbon atoms, more preferably from 5 to 8 carbon atoms.

Suitable non-dimeric diols may be independently selected from straight chain aliphatic diols or branched aliphatic diols, or a combination thereof.

Suitable non-dimeric diols include straight chain aliphatic diols such as ethylene glycol, diethylene glycol, 1,3-propylene glycol, dipropylene glycol, 1,4-butylene glycol, 1,6-hexylene glycol (also known as hexanediol) and mixtures thereof, branched diols such as neopentyl glycol, 3-methyl pentane glycol, 1,2-propylene glycol and mixtures thereof, and cyclic diols such as 1,4-bis(hydroxymethyl)cyclohexane and 1,4-cyclohexane-dimethanol and mixtures thereof.

Preferred straight chain aliphatic diols may be independently selected from ethylene glycol, diethylene glycol, 1,3-propylene glycol (better known as 1,3-propanediol), 1,4-butanediol, 1,6-hexanediol and mixtures thereof.

Preferred branched aliphatic diols may be independently selected from 1,2-propylene glycol, 1,2-butanediol, 2,3-butanediol, 1,3-butanediol, methylpropane diol and mixtures thereof.

The non-dimeric diol may be selected from hexanediol, neopentyl glycol, methylpropane diol, butanediol, diethyleneglycol and mixtures thereof.

Hexanediol is particularly preferred as a non-dimeric diol.

The polyol may comprise at least 10 wt % non-dimeric diol, preferably at least 20 wt %. The polyol may comprise at most 50 wt % non-dimeric diol, preferably at most 40 wt %, more preferably at most 30 wt %.

The polyol may further comprise:
c) at least one residue of a C2 to C10 diol.

The at least one residue of a C2 to C10 diol may be a non-dimeric diol as described herein. The polyol may comprise at least 10 wt % of a C2 to C10 diol, preferably at least 20 wt %. The polyol may comprise at most 50 wt % of a C2 to C10 diol, preferably at most 40 wt %, more preferably at most 30 wt %. Preferably the polyol comprises at least 10 wt % and at most 50 wt % of the at least one residue of a C2 to C10 diol.

The at least one residue of a C2 to C10 diol may be selected from hexanediol, neopentyl glycol, methylpropane diol, butanediol, diethyleneglycol and mixtures thereof.

The polyol may have a molecular weight (number average) of at least 500, preferably at least 800, more preferably at least 1000, even more preferably at least 1500, especially preferably at least 1800.

The polyol may have a molecular weight (number average) of at most 5000, preferably at most 4000, more preferably at most 3000, even more preferably at most 2500, especially preferably at most 2200.

Preferably the polyol has a number average molecular weight of at least 500 g/mol and at most 5000 g/mol.

The molecular weight (number average) may be determined by gel permeation chromatography or by end-group analysis. Preferably the molecular weight (number average) is determined by end-group analysis.

A higher molecular weight (number average) in the polyol may cause an elastomer made from the polyol to have a lower modulus (e.g. a lower 100% or 300% modulus). A polyol with a molecular weight (number average) of at most 5000 may advantageously be used to make a polyurethane elastomer with a improved (higher) modulus.

A higher molecular weight (number average) in the polyol may cause the polyol to have a higher viscosity at a predetermined temperature. A polyol with a molecular weight (number average) of at most 4000 may have improved processability when making a polyurethane elastomer when compared with a polyol with a number average molecular weight above 4000. This improved processability may be due to the lower viscosity at a predetermined temperature of the polyol with a molecular weight (number average) of at most 4000.

The polyol may have a glass transition temperature (Tg) of at most −30° C., preferably at most −40° C., more preferably less than −50° C. The polyol may have a glass transition temperature of at least −100° C., preferably at least −80° C., more preferably at least −60° C. Preferably the polyol has a glass transition (Tg) temperature of at least −100° C. and at most −30° C.

If the polyol has a glass transition temperature (Tg) of at least −100° C. and at most −30° C., this may cause a polyurethane elastomer made from the polyol to have an improved balance of flexibility and rigidity.

The glass transition temperature may be determined using DSC (differential scanning calorimetry). The DSC may be performed using a Mettler Toledo Instrument Module: DSC822.

The polyol may have a melting point temperature (Tm) of at most 125° C., preferably at most 100° C., more preferably at most 80° C. The polyol may have a melting point temperature (Tm) of at least −30° C., preferably at least −10° C., more preferably at least +10° C.

If the polyol has a melting point temperature (Tm) of at most 80° C., this may cause the polyol to have improved processability when making a polyurethane elastomer when compared with a polyol with a melting point higher than 80° C.

The melting point temperature (Tm) may be determined using DSC (differential scanning calorimetry). The DSC may be performed using a Mettler Toledo Instrument Module: DSC822.

The polyol may be formed by a condensation reaction. The polyol may be a polycondensate.

The polyol may comprise at least 2 ester bonds, preferably at least 3 ester bonds, more preferably at least 4 ester bonds, even more preferably at least 5 ester bonds.

The polyol may comprise at most 10 ester bonds, preferably at most 8 ester bonds, more preferably at most 7 ester bonds.

The polyol may be a polyester.

The polyol may comprise at least one ether bond. The polyol may be a polyesterether. Alternatively, the polyol may not comprise an ether bond.

The polyol may comprise at least one amide bond. The polyol may comprise at least one dimer fatty diamine residue. Alternatively, the polyol may not comprise an amide bond.

The polyol may be a polyesteramide. The polyol may be a polyesteretheramide.

The polyol is preferably formed from dicarboxylic acid to diol starting materials at a molar ratio in the range from 1:1 to 1:5, more preferably from 1:1.05 to 1:3, particularly preferably from 1:1.1 to 1:2, and especially preferably from 1:1.2 to 1:1.4. Thus, the amount of diol in the polyol is preferably present in molar excess so as to obtain a polyol terminated at both ends with hydroxyl groups. The polyol may comprise at least two hydroxyl end groups. The polyol may comprise two hydroxyl end groups.

The polyol preferably has a hydroxyl value (measured as described herein) in the range from 10 to 100, more preferably 30 to 90, particularly preferably 40 to 70, and especially preferably 50 to 60 mgKOH/g.

In addition, the polyol preferably has an acid value (measured as described herein) of less than 2, more preferably less than 1.7, particularly preferably less than 1.3, and especially preferably less than 1.0 mgKOH/g.

The polyol of the second aspect of the invention may include any of the features described herein with regard to the polyol described in connection with the polyurethane elastomer of the first aspect of the invention.

According to the first aspect of the invention, the present invention provides a polyurethane elastomer obtainable by reacting a polyol and an isocyanate wherein the polyol comprises:
a) at least one dimer fatty residue selected from a dimer fatty diacid residue, a dimer fatty diol residue and a dimer fatty diamine residue; and
b) at least one furan dicarboxylic acid residue.

The polyurethane elastomer may be obtained by reacting the polyol with an isocyanate.

The polyurethane elastomer may be obtainable, and is preferably obtained, by reacting the polyol with a polyisocyanate to form:
(i) the polyurethane elastomer; or
(ii) an isocyanate-terminated pre-polymer which is then reacted with a chain extender to form the polyurethane elastomer.

According to the third aspect of the invention, the present invention provides a method of making a polyurethane elastomer comprising reacting a polyol of the second aspect of the invention with an isocyanate to form:
(i) the polyurethane elastomer; or
(ii) an isocyanate-terminated pre-polymer which is then reacted with a chain extender to form the polyurethane elastomer.

The polyurethane elastomer of the invention may be the reaction product of a pre-polymer and a chain extender. As employed herein, the term "pre-polymer" means the reaction product of at least one polyol and an isocyanate. The isocyanate-terminated pre-polymer may be included in a pre-polymer mixture that comprises the isocyanate-terminated pre-polymer, an amount of unreacted isocyanate, and optionally one or more solvents, plasticizers or other additives. As employed herein, the term "unreacted isocyanate" refers to unreacted or residual isocyanate monomer that is in the pre-polymer mixture after formation of the polyurethane pre-polymer.

The polyurethane elastomer may be a solid. The polyurethane elastomer may be non-adhesive. The polyurethane elastomer may have substantially no adherent properties. The polyurethane elastomer may comprise a surface. A surface of the polyurethane elastomer may have substantially no adherent properties. Lack of adhesion may be desirable in a polyurethane elastomer so that it does not stick to other parts of an object in which it is contained.

The isocyanate may be a polyisocyanate. The isocyanate may be a diisocyanate.

The isocyanate component of the polyurethane elastomer or pre-polymer is preferably at least one isocyanate which has a functionality of at least 2.

The isocyanate may be an aliphatic isocyanate, such as hexamethylene 1,6-diisocyanate or isophorone diisocyanate (IPDI). Preferably, the isocyanate is an aromatic isocyanate, more preferably an aromatic diisocyanate. An aromatic isocyanate may be preferred for making a polyurethane elastomer because an aromatic isocyanate may provide improved rigidity or strength to the elastomer due to its aromatic structure when compared with an aliphatic isocyanate.

Suitable aromatic isocyanates may be selected from toluene diisocyanate, m-phenylene diisocyanate, p-phenylene diisocyanate, xylylene diisocyanate, 4,4'-diphenylmethane diisocyanate, polymethylenepolyphenyl diisocyanate, 3,3'-dimethyl-4,4'-biphenylene diisocyanate, 3,3'-dimethyl-4,4'-diphenylmethane diisocyanate, 3,3-dichloro-4,4'-biphenylene diisocyanate, 1,5-naphthalene diisocyanate, or modified compounds thereof such as uretonimine-modified compounds thereof.

The above isocyanate monomers may be used alone or as mixtures thereof. In a preferred embodiment, 4,4'-diphenylmethane diisocyanate (MDI) is used alone, or more preferably a mixture of MDI and a uretonimine-modified 4,4'-diphenylmethane diisocyanate (modified MDI) is employed.

The pre-polymer reaction mixture may preferably have an isocyanate content (measured as described herein) in the range from 5% to 30%, more preferably 15 to 23%, particularly 17% to 20%, and especially 18% to 19% NCO.

In one embodiment of the invention, at least one of the aforementioned isocyanates is reacted with the polyol of the first or second aspect, to form the pre-polymer.

The ratio of isocyanate to polyol starting materials which are mixed together to react to form the pre-polymer is preferably in the range from 20 to 80:20 to 80, more preferably 35 to 75:25 to 65, particularly 45 to 70:30 to 55, and especially 55 to 65:35 to 45 by weight.

The isocyanate is preferably used in molar excess relative to hydroxyl group content of the polyol, so as to obtain a reaction mixture containing isocyanate-terminated pre-polymer and sufficient unreacted isocyanate, such that later addition of the chain extender can result in reaction to form the polyurethane, without the requirement for adding further isocyanate.

The pre-polymer may be produced by efficiently mixing the polyol with isocyanate.

In the polyurethane synthesis, the NCO/OH molar ratio employed is preferably in the range from 1 to 1.2:1, more preferably 1 to 1.1:1, and particularly 1 to 1.03:1.

The polyol and isocyanate may be reacted at an elevated temperature. Said elevated temperature may be in the range from 50° C. to 80° C. Preferably, in the range from 60° C. to 75° C.

A chain extender may optionally be present for forming the polyurethane. The polyurethane may further comprise the chain extender. The chain extender may be in the form of a chain extender composition. The chain extender composition is preferably prepared by simple pre-mixing of, for example, the chain extender, a polyol of the first or second aspect of the invention and other additives (such as blowing agent, and/or urethane catalyst, and/or pigment and/or filler and/or blowing agent).

The chain extender component used to form the polyurethane suitably comprises a low molecular weight compound having two or more active hydrogen groups, for example ethylene glycol, diethylene glycol, propylene glycol, 1,4-butylene glycol, 1,5-pentylene glycol, methylpentanediol, isosorbide (and other iso-hexides), 1,6-hexylene glycol, neopentyl glycol, trimethylolpropane, hydroquinone ether alkoxylate, resorcinol ether alkoxylate, glycerol, pentaerythritol, diglycerol, and dextrose; dimer fatty diol; aliphatic polyhydric amines such as ethylenediamine, hexamethylenediamine, and isophorone diamine; aromatic polyhydric amines such as methylene-bis(2-chloroaniline), methylenebis(dipropylaniline), diethyl-toluenediamine, trimethylene glycol di-p-aminobenzoate; alkanolamines such as diethanolamine, triethanolamine and diisopropanolamine.

In a preferred embodiment of the invention, the chain extender is a diol, particularly having an aliphatic linear carbon chain comprising in the range from 1 to 10, and especially 3 to 5 carbon atoms. Preferred diols include ethylene glycol, propylene glycol, 1,4-butylene glycol, and 1,5-pentylene glycol. 1,4-butylene glycol is particularly preferred.

The molar ratio of chain extender to polyol of the first or second aspect of the invention employed is preferably in the range from 1 to 10:1, more preferably 1.5 to 8:1, particularly 2 to 5:1, and especially 2.5 to 4:1.

In the present invention, the polyurethane composition may optionally contain other additives such as blowing agents, urethane promoting catalysts, pigments, fillers, blowing agents, surfactant, and stabilisers.

Suitable blowing agents include water, and fluorocarbons such as trichlorofluoromethane, dichlorodifluoromethane and trichlorodifluoroethane. The blowing agents may be used alone or as mixtures thereof.

Examples of urethane catalysts include tertiary amines such as triethylamine, 1,4-diazabicyclo[2.2.2.]octane (DABCO), N-methylmorpholine, N-ethylmorpholine, N,N, N',N'-tetramethylhexamethylenediamine, 1,2-dimethylimidazol; and tin compounds such as tin(II)acetate, tin(II) octanoate, tin(II)laurate, dibutyltin dilaurate, dibutyltin dimaleate, dioctyltin diacetate and dibutyltin dichloride. The catalysts may be used alone or as mixtures thereof.

Suitable surfactants include silicone surfactants such as dimethylpolysiloxane, polyoxyalkylene polyol-modified dimethylpolysiloxane and alkylene glycol-modified dimethylpolysiloxane; and anionic surfactants such as fatty acid salts, sulphuric acid ester salts, phosphoric acid ester salts and sulphonates.

Examples of the stabilisers include hindered phenol radical scavengers such as dibutylhydroxytoluene, pentaerythrityl-tetrakis[3-(3,5-di-t-butyl-4-hydroxyphenyl) propionate] and isooctyl-3-(3,5-di-t-butyl-4-hydroxyphenyl) propionate; antioxidants such as phosphorous acid compounds such as triphenylphosphite, triethylphosphite and triphenylphosphine; ultraviolet absorbing agents such as 2-(5-methyl-2-hydroxyphenyl)benzotriazole and a condensation product of methyl-3-[3-t-butyl-5-(2H-benzotriazole-2-yl)-4-hydroxyphenyl]propionate and polyethylene glycol.

Suitable pigments include inorganic pigments such as transition metal salts; organic pigments such as azo compounds; and carbon powder. Suitable fillers include inorganic fillers such as clay, chalk, and silica.

The dimer fatty residue content of the polyurethane elastomer is preferably in the range from 5 to 50%, more preferably 8 to 40%, particularly 12 to 30%, and especially 15 to 20% by weight.

The polyurethane elastomer is preferably derived from renewable and/or bio-based sources. The level of this may be determinable by ASTM D6866 as described herein.

Preferably, the polyurethane elastomer has a renewable carbon content of at least 50% when determined using ASTM D6866. More preferably, at least 65%. Most preferably, at least 80%.

It has been found that use of known polyester polyols may make a polyurethane elastomer susceptible to hydrolysis, or degradation by UV/thermo-oxidation. These shortcomings limit the application possibilities of conventional polyurethane elastomers. Polyurethane elastomers according to the first aspect of the present invention are found to have good thermo-oxidative and UV stability. Additionally, said polyurethane elastomers may have good thermal stability, and good hydrolytic stability thereby offering resistance against attack by acids, alkalis, and alcohols.

The polyurethane elastomer may be a solid elastomer or a microcellular elastomer. The elastomer may be a reinforced elastomer. The reinforced elastomer may comprise reinforcing fibres or fibre mats. The reinforcing fibres may comprise glass fibres, carbon fibres or polyester fibres.

The polyurethane elastomer may have a tensile strength at break measured according to ISO 527-2 norm of at least 7 MPa, preferably at least 9 MPa, more preferably at least 10 MPa. The tensile strength measured according to ISO 527-2 norm is a standard measurement which measures a standard elastomer sample. The tensile strength at break may be at most 30 MPa. The polyurethane elastomer may have a (maximum) elongation according to ISO 527-2 of at least 400%, preferably at least 430%, more preferably at least 450%. The elastomer may have a (maximum) elongation of at most 900%.

The modulus will be understood to represent the force (stress) required to produce a certain elongation (strain). For example, in the case of the 100% modulus, this is a measure of the tensile strength at 100% elongation. Compounds with a higher modulus will be understood to be more resilient and more resistant to extrusion.

The polyurethane elastomer may have a 100% modulus value of at least 3 MPa, preferably at least 3.5 MPa, more preferably at least 4 MPa. The polyurethane elastomer may have a 100% modulus value of at most 20 MPa.

The polyurethane elastomer may have a 300% modulus value of at least 5 MPa, preferably at least 6 MPa, more preferably at least 7 MPa. The polyurethane elastomer may have a 300% modulus value of at most 30 MPa.

The polyurethane elastomer may also exhibit good hardness properties. The hardness of the elastomer may be defined as the material's resistance to permanent indentation. The polyurethane elastomer may have a Shore A hardness of at least 60 Shore A, preferably at least 70, more preferably at least 80. The Shore A hardness may be measured according to ISO 868 norm. The polyurethane elastomer may have a Shore A hardness of at most 120 Shore A.

All of the features described herein may be combined with any of the above aspects, in any combination.

EXAMPLES

The present invention will now be described further by way of example only with reference to the following Examples. All parts and percentages are given by weight unless otherwise stated. It will be understood that all tests and physical properties listed have been determined at atmospheric pressure and room temperature (i.e. about 20° C.), unless otherwise stated herein, or unless otherwise stated in the referenced test methods and procedures.

Compounds as used in the following examples are identified as follows:

1,4-butanediol (BDO)—a bio-based version is available from BioAmber
1,6-hexanediol (HDO)
Adipic acid ($C_6$ dicarboxylic acid)—a bio-based version is available from Verdezyne
2,5-furan dicarboxylic acid (FDCA)—available under the trade name 'YXY' from Avantium
PRIPOL 1006™ dimer fatty diacid—hydrogenated $C_{36}$ dimer dicarboxylic acid ex Croda
4,4' diphenylmethane diisocyanate (MDI)

Test methods used in the following examples are as follows:

Number average molecular weight was determined by end group analysis with reference to the hydroxyl value.
Weight average molecular weight was determined by end group analysis with reference to the hydroxyl value.
The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

The acid value is defined as the number of mg of potassium hydroxide required to neutralise the free fatty acids in 1 g of sample, and was measured by direct titration with a standard potassium hydroxide solution.

The isocyanate (NCO) value or content is defined as the weight % content of isocyanate in the sample and was determined by reacting with excess dibutylamine, and back titrating with hydrochloric acid.

Hardness was measured using a Shore A meter on a 10 mm thick sample according to ISO 868. A mean value of 10 readings was calculated.

Elongation was measured using an Instron tensile tester according to ISO 527-2 norm.

Tensile Strength was measured using an Instron tensile tester according to ISO 527-2 norm.

Modulus was calculated as the tensile strength required to achieve a predetermined elongation.

Comparative Example P1: Formation of Polyol 1 (a FDCA Based Polyol)

This is a comparative example not according to the present invention. 100 parts by weight of 2,5-furan dicarboxylic acid and 106 parts by weight hexanediol were charged to a reactor equipped with a stirrer, a thermometer, a gas inlet and a condenser. In addition 0.1% by weight of stannous octoate as catalyst was added to the reactor. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value of less than 1 mg KOH/g and a hydroxyl value of 56 mg KOH/g, equivalent to an number average molecular weight of about 2000 g/mol.

Examples P2 to P5: Formation of Polyols 2 to 5 (FDCA/Dimer Based Polyols)

Polyols 2 to 5 were made using the following general method. The specific amounts of A—PRIPOL 1006, B—2,5-furan dicarboxylic acid and C—hexanediol used to make Polyols 2 to 5 are given in Table 1 below.

General Method for Examples P2 to P5

A parts by weight PRIPOL 1006 and C parts by weight hexanediol were charged to a reactor equipped with a stirrer, a thermometer, a gas inlet and a condenser. The temperature in the reactor was raised to 180° C. under normal pressure in a nitrogen atmosphere. An esterification reaction was conducted under these conditions until a 50% reduction of the initial acid value was achieved. The temperature was then lowered to 160° C. where upon B parts weight 2,5-furan dicarboxylic acid and 0.1% by weight of stannous octoate as catalyst were added to the reactor. The temperature was raised to 220-230° C. under normal pressure in a nitrogen atmosphere. Under these conditions the esterification reaction was conducted until the desired acid and hydroxyl value were obtained. The evaluation results of the obtained polyols 2 to 5 gave an acid value of less than 1 mg KOH/g and a hydroxyl value of 56 mg KOH/g, equivalent to an number average molecular weight of about 2000 g/mol.

TABLE 1

Parts by Weight of components A to C in Polyols 1 to 5

| Polyol | Weight ratio A/B (A:B) | A - PRIPOL 1006 parts by weight | B - FDCA parts by weight | C - hexanediol parts by weight |
|---|---|---|---|---|
| 1 | 0/100 | — | 100 | 106 |
| 2 | 50/50 (1:1) | 100 | 100 | 113.2 |
| 3 | 70/30 (2.33:1) | 100 | 42.8 | 64.5 |
| 4 | 80/20 (4:1) | 100 | 25 | 49.3 |
| 5 | 90/10 (9:1) | 100 | 11.1 | 37.4 |

Comparative Example P6: Formation of Polyol 6 (a Dimer Based Polyol)

This is a comparative example not according to the present invention. 100 parts by weight PRIPOL 1006 and 28 parts by weight hexanediol were charged to a reactor equipped with stirrer, a thermometer, a gas inlet and condenser. In addition 0.1% by weight of stannous octoate as catalyst was added. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value <1 mg KOH/g and a hydroxyl value of 56 mg KOH/g, equivalent to an number average molecular weight of about 2000 g/mol

Comparative Example P7: Formation of Polyol 7 (a Dimer/Adipic Based Polyol)

This is a comparative example not according to the present invention. 100 parts by weight PRIPOL 1006, 11.1 parts by weight adipic acid and 38 parts by weight hexanediol, were charged to a reactor equipped with stirrer, a thermometer, a gas inlet and condenser. In addition 0.1% by weight of stannous octoate as catalyst was added. The temperature in the reactor was raised to 220-230° C. under normal pressure in a nitrogen atmosphere. An esterification reaction was conducted under these conditions until the desired acid and hydroxyl value were obtained. The evaluation results of the obtained polyester polyol gave an acid value <1 mg KOH/g and a hydroxyl value of 56 mg KOH/g, equivalent to an number average molecular weight of about 2000 g/mol.

Example T1: Thermographic Analysis of the Polyols 1 to 6

A thermographic analysis of the Polyols 1 to 6 was performed to determine glass transition temperature (Tg) and melting point (Tm) of the polyols. The analysis was performed using DSC (differential scanning calorimetry) with the following method and instrument settings.

Instrument:
　　Module: DSC822 (Name: DSC822-LT)
　　Manufacturer: Mettler Toledo
Method 1: −150(10) . . . 200(2×)/20 N2=30
　　Temperature program:
　　Isotherm Segment 1:10 min at −150° C.
　　Dynamic Segment 2:
　　　　Start temperature: −150° C.
　　　　End temperature: 200° C.
　　　　Heating rate: 20° C./min Isotherm Segment 3: 1 min at 200° C.
Dynamic Segment 4:
　　Start temperature: 200° C.
　　End temperature: −150° C.
　　Heating rate: −20° C./min
Isotherm Segment 5: 10 min at −150° C.
Dynamic Segment 6:
　　Start temperature: −150° C.
　　End temperature: 200° C.
　　Heating rate: 20° C./min
Method 2: −100(10) . . . 200(2×)/10 N2=30
　Temperature program:
　Isotherm Segment 1:10 min at −100° C.
　Dynamic Segment 2:
　　Start temperature: −100° C.
　　End temperature: 200° C.
　　Heating rate: 10° C./min
　Isotherm Segment 3: 1 min at 200° C.
　Dynamic Segment 4:
　　Start temperature: 200° C.
　　End temperature: −100° C.
　　Heating rate: −10° C./min
　Isotherm Segment 5: 10 min at −100° C.
　Dynamic Segment 6:
　　Start temperature: −100° C.
　　End temperature: 200° C.
　　Heating rate: 10° C./min
Atmosphere:
　Purge gas: N2
　Flow rate: 30 ml/min
Sample:
　Size: ~15 mg
　Pan: 40 µl Aluminium crucible with automatic pierceable lid An average of the results from Method 1 and Method 2 was obtained for each polyol and the average results of the Differential Scanning calorimetry analysis are given in Table 2 below.

TABLE 2

Results of Differential Scanning Calorimetry

| Polyol | Tg (° C.) | Tm (° C.) | Physical form at room temperature |
|---|---|---|---|
| 1 | 13 | 144 | White solid |
| 2 | −41 | 121 | White solid |
| 3 | −48 | 96 | White solid/waxy |
| 4 | −52 | 69 | Waxy |
| 5 | −56 | 35 | Semi-transparent/liquid |
| 6 | −51 | 2 | Liquid |

Tg: glass transition
Tm: melting point

Examples E5, E6 & E7: Polyurethane Elastomers Formed from Polyols 5, 6 and 7

Polyurethane elastomers were made from Polyol 5 of Example P5 (E5), Polyol 6 of Comparative Example P6 (E6) and Polyol 7 of Comparative Example P7 (E7). The polyurethane elastomers E5, E6 and E7 were prepared using 1 part by weight of Polyol 5, 6 or 7, 2 parts 1,4-butanediol (BDO) as a chain extender, and 3.1 parts 4,4'-5 diphenylmethane diisocyanate (MDI), using a one-shot method. To form the elastomer Polyol 5, 6 or 7 and 1,4-butanediol (BDO) chain extender were blended and pre-heated at 50° C. and degassed in a degassing chamber. The Polyol and BDO were mixed thoroughly, after which molten 4,4'-diphenylmethane diisocyanate (MDI) was added. The reaction mixture was stirred efficiently, transferred to the degassing chamber for a few minutes until significant viscosity increase occurred. The mixture was then poured into a preheated 100° C. steel mould. The mould was closed and transferred to an oven at 100° C. After 2 hours the elastomer was de-moulded and further cured at 100° C. for another 18 hours. The physical properties of each elastomer E5, E6 and E7 were determined and are shown in Table 3 below.

TABLE 3

Physical properties of Elastomers E5, E6 and E7

|  | E5 | E6 (comparative) | E7 (comparative) |
|---|---|---|---|
| Hardness (Shore A) | 85 | 75 | 75 |
| Tensile strength at break (MPa) | 11 | 8 | 6 |
| Elongation (%) | 453.9 | 428.4 | 366.6 |
| 100% Modulus (MPa) | 4.4 | 3.5 | 3.5 |
| 300% Modulus (MPa) | 7.2 | 5.5 | 4.5 |

It can be seen from the results in the above table that the polyurethane elastomer E5 according to the invention which is based on the polyol 5 shows a higher Shore A hardness than the comparative examples E6 and E7. Furthermore the elastomer E5 exhibits a higher tensile strength and elongation than elastomer E7 based on the dimer/adipic containing comparative polyol 7. The elastomer E5 shows increased tensile strength over elastomers E6 and E7, which can be related to the inclusion of the FDCA in polyol 5 but maintains the elongation comparable to the elastomer E6 based on the dimer-only comparative polyol 6.

It is to be understood that the invention is not to be limited to the details of the above embodiments, which are described by way of example only. Many variations are possible.

The invention claimed is:

1. A polyurethane elastomer obtainable by reacting a polyol and an isocyanate wherein the polyol comprises:
    a) at least one dimer fatty residue selected from a dimer fatty diacid residue, a dimer fatty diol residue and a dimer fatty diamine residue;
    b) at least one furan dicarboxylic acid residue; and
    c) at least 10 wt % of at least one residue of a $C_2$ to $C_{10}$ diol based on the total weight of the polyol,
    wherein the weight ratio of the at least one dimer fatty residue to the at least one furan dicarboxylic acid residue is at least 1:1 and at most 20:1 and
    wherein the polyurethane elastomer is non-adhesive.

2. A polyurethane elastomer as claimed in claim 1 wherein the polyol comprises at least 20 wt % and at most 80 wt % of the at least one dimer fatty residue based on the total weight of the polyol.

3. A polyurethane elastomer as claimed in claim 1 wherein the polyol comprises at least 5 wt % and at most 40 wt % of the at least one furan dicarboxylic acid residue based on the total weight of the polyol.

4. A polyurethane elastomer as claimed in claim 1 wherein the weight ratio of dimer fatty residue to furan dicarboxylic acid residue in the polyol is at least 4:1 and at most 20:1.

5. A polyurethane elastomer as claimed in claim 1 wherein the polyol has a number average molecular weight of at least 500 and at most 5000.

6. A polyurethane elastomer as claimed in claim 1 wherein the polyol has a glass transition (Tg) temperature of at least −100° C. and at most −30° C.

7. A polyurethane elastomer as claimed in claim 1 wherein the polyol has a melting point (Tm) temperature of at most 80° C.

8. A polyurethane elastomer as claimed in claim 1 wherein the polyol comprises at least 10 wt % and at most 50 wt % of the at least one residue of a $C_2$ to $C_{10}$ diol based on the total weight of the polyol.

9. A polyurethane elastomer as claimed in claim 1 which further comprises a chain extender, wherein the chain extender is a diol.

10. A polyurethane elastomer as claimed in claim 1 wherein a surface of the elastomer has no adherent properties.

11. A polyurethane elastomer as claimed in claim 1 which has a tensile strength at break of at least 7 MPa when measured according to ISO 527-2.

12. A polyurethane elastomer as claimed in claim 1 which has a Shore A hardness of at least 60 when measured according to ISO 868.

13. A polyurethane elastomer as claimed in claim 1 which has a 100% modulus of at least 3 MPa when measured according to ISO 527-2.

14. A method of making a polyurethane elastomer comprising reacting a polyol with an isocyanate to form:
   (i) the polyurethane elastomer; or
   (ii) an isocyanate-terminated pre-polymer which is then reacted with a chain extender to form the polyurethane elastomer, wherein the polyol comprises:
   a) at least one dimer fatty residue selected from a dimer fatty diacid residue, a dimer fatty diol residue and a dimer fatty diamine residue;
   b) at least one furan dicarboxylic acid residue; and
   c) at least 10 wt % of at least one residue of a $C_2$ to $C_{10}$ diol based on the total weight of the polyol,
   wherein the weight ratio of the at least one dimer fatty residue to the at least one furan dicarboxylic acid residue is at least 1:1 and at most 20:1 and
wherein the polyurethane elastomer is non-adhesive.

15. The method as claimed in claim 14, wherein the polyurethane elastomer has no adherent properties.

* * * * *